United States Patent
Martin et al.

(10) Patent No.: US 7,159,060 B2
(45) Date of Patent: Jan. 2, 2007

(54) PCI STANDARD HOT-PLUG CONTROLLER (SHPC) WITH USER PROGRAMMABLE COMMAND EXECUTION TIMING

(75) Inventors: Peter N. Martin, Olympia, WA (US); Jaishankar V. Thayyoor, Kent, WA (US)

(73) Assignee: Intel Corporation, Santa Clara, CA (US)

( * ) Notice: Subject to any disclaimer, the term of this patent is extended or adjusted under 35 U.S.C. 154(b) by 275 days.

(21) Appl. No.: 10/749,076

(22) Filed: Dec. 30, 2003

(65) Prior Publication Data

US 2005/0149657 A1    Jul. 7, 2005

(51) Int. Cl.
*G06F 13/00* (2006.01)

(52) U.S. Cl. ................ 710/302; 710/301; 710/303; 710/304; 710/25; 710/117; 710/124

(58) Field of Classification Search ........ 710/301–304, 710/100, 117, 124
See application file for complete search history.

(56) References Cited

U.S. PATENT DOCUMENTS 6,728,808 B1 *  4/2004  Brown ................. 710/107
2003/0093604 A1 *  5/2003  Lee ..................... 710/302
2004/0044817 A1 *  3/2004  Thurlo et al. ........... 710/305
2004/0064620 A1 *  4/2004  Kaushik et al. ......... 710/302

* cited by examiner

Primary Examiner—Rehana Perveen
Assistant Examiner—Kim T. Huynh
(74) Attorney, Agent, or Firm—Blakely, Sokoloff, Taylor & Zafman LLP

(57) ABSTRACT

According to embodiments of the present invention, a peripheral component interconnect (PCI) standard hot-plug controller (SHPC) includes a command register to store PCI slot operation commands for one or more target PCI slots and a programmable register that may be programmed with one timing parameter value (e.g., Tpccc, Tpece, Tcebe, Tbkrk, etc.) for a signal sequence for execution of one PCI slot operation command and another timing parameter value for a signal sequence for execution of another PCI slot operation command depending on the particular target PCI slot, the particular PCI slot operation command loaded into the command register, and/or the number of times a particular PCI slot operation command has been loaded into the command register, for example.

31 Claims, 7 Drawing Sheets

PCI STANDARD HOT-PLUG CONTROLLER (SHPC) WITH USER PROGRAMMABLE COMMAND EXECUTION TIMING

BACKGROUND

1. Field

Embodiments of the present invention relate to hot-plug technology and, in particular, to peripheral component interconnect (PCI) standard hot-plug controllers.

2. Discussion of Related Art

A peripheral component interconnect (PCI) bus is a bus in a computer system that interconnects a microprocessor and peripheral devices, such as keyboards, disk drives, video adapters, etc. A PCI bus has slots into which the adapter cards for the peripheral devices can be inserted or removed. Hot-plug technology allows a user to physically remove or insert one or more PCI adapter cards without having to remove power to the entire system or re-booting the system software. Only the individual PCI slots are affected and the other devices in the system are not disrupted.

Hot-plug controllers were being developed by various vendors that were compatible with the *PCI Hot-Plug Specification, Revision* 1.0, Oct. 6, 1997, PCI Special Interest Group, Portland, Oreg. It has been proposed that standardized hot-plug controllers be developed so that vendor-specific hot-plug controllers could be compatible across many platforms. The *PCI Standard Hot-Plug Controller and Subsystem Specification, Revision* 1.0, Jun. 20, 2001, PCI Special Interest Group, Portland, Oreg., (hereinafter "SHPC Specification") was developed to meet this challenge.

The SHPC Specification provides several commands that may be implemented for insertion and removal of adapter cards. One command may be a "PWRONLY" command, which instructs the SHPC to power up one or more target PCI slots without connecting clock or bus signals to the slots. Another command may be an "ENABLE" command, which instructs the SHPC to power up one or more target PCI slots, and to connect the clock and bus signals. Another command may be a "DISABLE" command, which instructs the SHPC to disconnect power, clock, and bus signals from one or more target PCI slots. Another command may be a "SET BUS SEGMENT SPEED" command, which instructs the SHPC to change the speed of the PCI bus.

The SHPC Specification provides that the application of power to the PCI bus be in strict accordance with the timing specification provided therein. The enabling of the bus and clocks on the PCI bus must be in strict accordance with the timing specification as well.

The device supporting the SHPC typically provides several control signals to the SHPC, such as a signal to control the power state of one or more target PCI slots (e.g., PWREN), a signal to control the connection of the PCI clock to one or more target PCI slots (e.g., CLKEN), a signal to control the connection of various bus signals to one or more target PCI slots (e.g., BUSEN), a signal to reset one or more target PCI slots (e.g., RST), and/or a signal indicating that state of rail power to a target PCI slot (e.g. CARD PWR). When the SHPC is executing a command, such as PWRONLY, ENABLE, DISABLE, etc., the signals provided to the SHPC are asserted in a signal sequence. The time delay between assertion (or de-assertion) of one signal and assertion (or de-assertion) of another signal is referred to herein as a timing parameter.

The SHPC designer selects a value for each timing parameter. Selecting only one value for a timing parameter introduces a problem, however. All products and platforms that utilize the SHPC must conform to the value selected.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Figure 1:
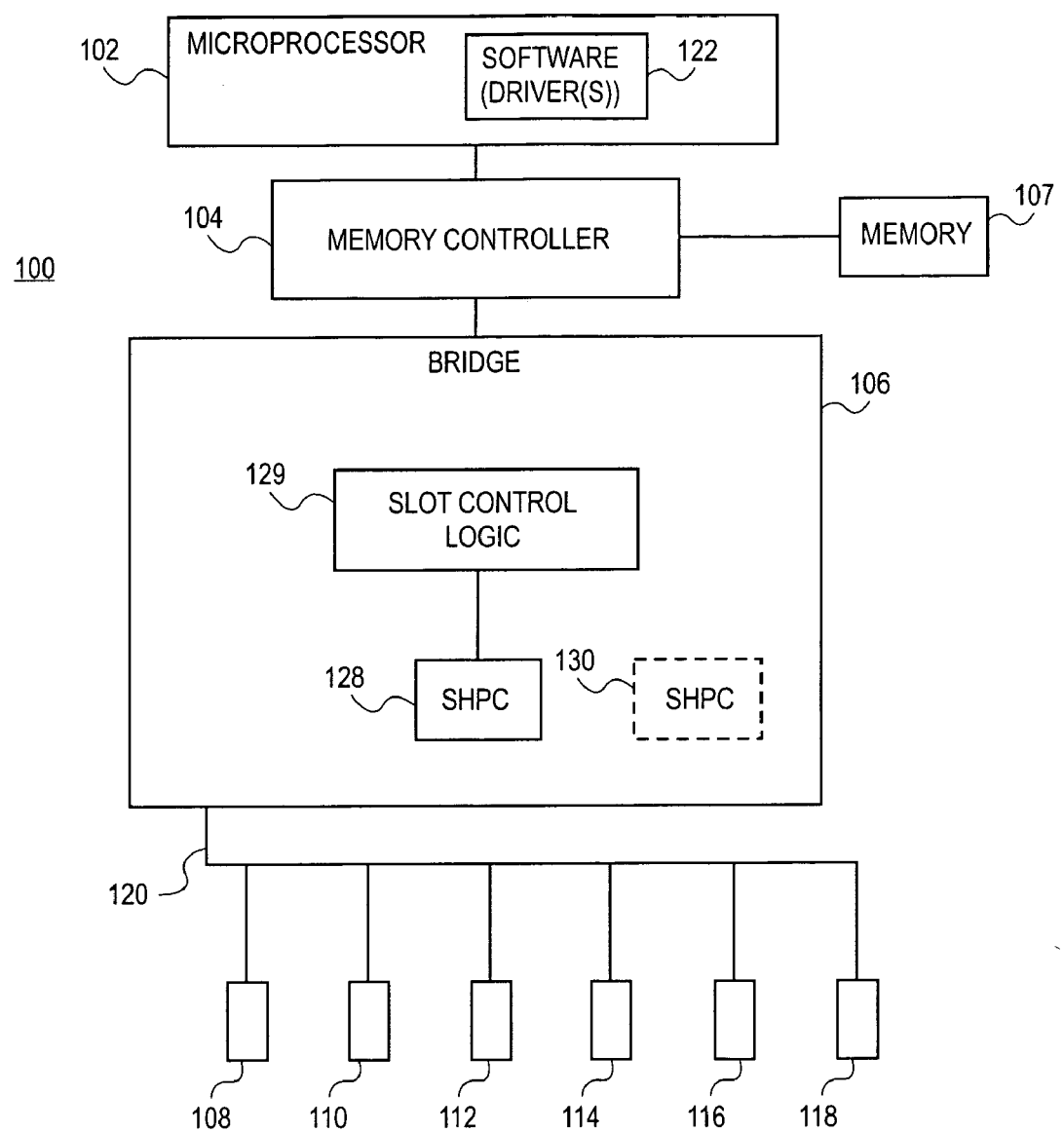
FIG. 1 is a high-level block diagram of a computer system according to an embodiment of the present invention.

FIG. 1 is a high-level block diagram of a computer system 100 according to an embodiment of the present invention. The system 100 in the illustrated embodiment includes a microprocessor 102 coupled to a memory controller 104. The memory controller 104 in the illustrated embodiment is coupled to a bridge 106 and to a memory 107. In one embodiment, the microprocessor 102 includes software 122, which may have drivers that drive commands to the bridge 106.

The bridge 106 in the illustrated embodiment also is coupled to one or more peripheral component interconnect (PCI) slots represented by the slots 108, 110, 112, 114, 116, and 118 via a PCI bus 120. Each of the slots 108, 110, 112, 114, 116, and 118 is designed to accept an adapter card (not shown). The adapter cards may include one or more PCI devices (e.g., printer, disk drive, keyboard, mouse, etc.)

In the illustrated embodiment, the bridge 106 includes a standard hot-plug controller (SHPC) 128 and an optional SHPC130 (as illustrated by the dashed lines). The SHPC 128 controls powering up and powering down of the slots to allow adapter cards to be inserted or removed from the slots without powering down the system 100 or re-booting the software 122.

Each SHPC 128 and 130 is associated with a PCI bus. In the illustrated embodiment, the SHPC 128 is associated with the PCI bus 120 and a PCI bus associated with the SHPC 130 is not shown. After reading the description herein, a person having ordinary skill in the relevant art will readily recognize how to implement the SHPC 130 for its associated PCI bus.

Each SHPC is associated with slot control logic. In the illustrated embodiment, the SHPC 128 is coupled to slot control logic 129.

The system 100 typically supports a high-performance desktop computer, a workstation, a server, etc. In one embodiment the system 100 is a UNIX platform. In other embodiments, the system 100 may be Windows® or Windows® NT platform. Those skilled in the art will appreciate that a variety of platforms may be used when implementing embodiments of the present invention.

The microprocessor 102 may be any suitable microprocessor that performs conventional functions of executing programming instructions including implementing embodiments of the present invention. The microprocessor 102 can be a processor of the Pentium® processor family available from Intel Corporation of Santa Clara, Calif., but might be any processor that is capable of implementing embodiments of the present invention. In one embodiment, the microprocessor 102 includes software 122, which may have drivers that drive commands to the bridge 106.

Of course, other software drivers independent of the microprocessor 102 may be used to drive commands to the bridge 106. After reading the description herein, a person having ordinary skill in the relevant art will readily recognize how to implement embodiments of the present invention using other software drivers.

The memory controller 104 may be any suitable memory controller that performs conventional functions of controlling and monitoring the status of memory 107 data lines, error checking, etc. The memory controller 104 also may be a primary interface to the microprocessor 102 and the bridge 106. Memory controller technology is well known.

The bridge 106 interfaces the processor/memory subsystem (i.e., the microprocessor 102, memory controller 104, and memory 107) to the PCI bus 120 hierarchy. The bridge 106 may include one or more known or proprietary PCI-Express interfaces (not shown) coupled to one or more known or proprietary PCI-X interfaces (not shown). Alternatively, the bridge 106 may be any host bridge, such as one capable of interfacing a processor/memory subsystem with a PCI bus. Alternatively still, the bridge 106 may be any PCI-to-PCI bridge. Bridge technology is well known.

The illustrated memory 107 may be any suitable memory that performs its conventional functions of storing data (pixels, frames, audio, video, etc.) and software (control logic, instructions, code, computer programs, etc.) for access by other system 100 components. The memory 107 may be any known dynamic random access memory (DRAM), static RAM (SRAM), Flash memory, etc. Memory technology is well known.

The slot control logic 129 may be electronic component(s) that are responsible for providing signals to the SHPC 128 to control the power state of one or more target PCI slots (e.g., PWREN), to control the connection of the PCI clock to one or more target PCI slots (e.g., CLKEN), to control the connection of various bus signals to one or more target PCI slots (e.g., BUSEN), to reset one or more target PCI slots (e.g., RST), and/or a signal indicating that state of rail power to a target PCI slot (e.g. CARD PWR).

As described above, when an SHPC is executing a PCI slot operation command, such as PWRONLY, ENABLE, DISABLE, etc., the control signals are asserted (or de-asserted) in a signal sequence and the time delay between assertion (or de-assertion) of one signal and assertion (or de-assertion) of another signal is a timing parameter.

One timing parameter may be a time delay between assertion of the signal to control a power state of a target PCI slot (e.g., PWREN) and assertion of the signal to control connection of a PCI clock to the target PCI slot (e.g., CLKEN). This timing parameter is referred to herein as Tpece.

Another timing parameter may be a time delay between assertion of the signal to control connection of a PCI clock to a target PCI slot (e.g., CLKEN) and assertion of the signal to control connection of at least one bus signal to the target PCI slot (e.g., BUSEN). This timing parameter is referred to herein as Tcebe.

Still another timing parameter may be a time delay between de-assertion of the signal to control a power state of one or more target PCI slots (e.g., PWREN) and de-assertion of a signal indicating completion of a PCI slot operation command (e.g., Controller Busy bit). This timing parameter is referred to herein as Tpccc.

Another timing parameter may be a time delay between assertion of the signal to control connection of at least one bus signal to the target PCI slot (e.g. BUSEN) and de-assertion of a signal to reset a target PCI slot (e.g. BUSEN) This timing parameter is referred to herein as Tbkrk.

Another timing parameter may be a time delay between assertion of the signal to indicating that power to a target PCI slot is valid and assertion of the signal to reset a target PCI slot (e.g., RST). This timing parameter is referred to herein as Tpvrh.

Another timing parameter may be a time delay between assertion of a signal to reset a target PCI slot (e.g., RST) and assertion of a signal indicating that a PCI slot operation command completion and that the SHPC is free to process other commands (e.g., Controller Busy bit). This timing parameter is referred to herein as Trhcc.

In embodiments of the present invention, the SHPC 128 includes timing parameter values that are user-programmable. This means that products and platforms can customize the SHPC 128 to their own liking. As technology advances the time it takes the CARD PWR to become valid and stable gets faster. That is, the time for an adapter card to be powered up to rail voltage is becoming smaller. Some platforms and products have the capability to go from no power to rail voltage rather quickly and they want the signal sequence for execution of a PCI slot operation command to enable quick connection of power, clock, and/or bus signals. There are other platforms and products that work best when power is stabilized before connecting clock and/or bus signals. The programmability of the timing parameter values permits the SHPC 128 to be implemented on platforms and products in both types of environments.

Having the SHPC 128 with timing parameter values that are user-programmable also means that a timing parameter can be programmed to change on-the-fly as the system 100 is operating. For example, there can be a different value programmed for a timing parameter depending on the particular PCI slot operation command to be executed. Thus, Tpece can be one value when a PWRONLY PCI slot operation command is to be executed and a different value when an ENABLE PCI slot operation command is to be executed.

There can be a different value programmed for a timing parameter depending on the PCI slot being targeted. Thus, Tcebe can be one value when targeting the slot 108 and a different value when targeting the slot 110.

There can be a different value programmed for a timing parameter depending on the number of times a PCI slot operation command has been issued. Thus, Tpccc can be one value when a PWRONLY PCI slot operation command is executed a first time and a different value the next time the PWRONLY PCI slot operation command is executed.

Figure 2:
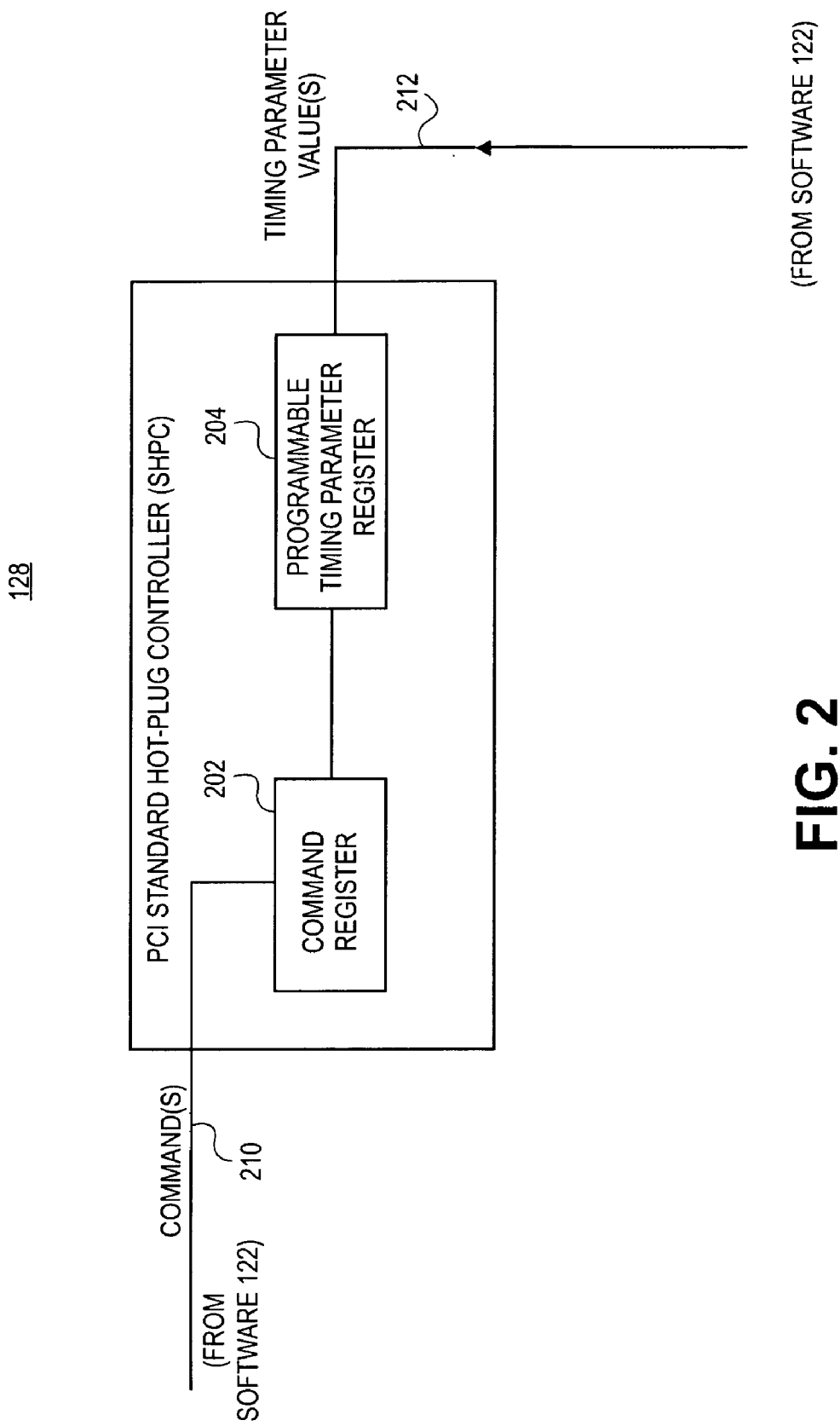
FIG. 2 is a high-level block diagram of a standard hot-plug controller depicted in FIG. 1 according to an embodiment of the present invention.

FIG. 2 is a high-level block diagram of the SHPC 128 according to an embodiment of the present invention. The SHPC 128 in the illustrated embodiment includes a command register 202. The command register 202 receives one or more commands 210 from the software 122 (or other software driver). Although depicted as a single register, the command register 202 may include one or more registers that store a PCI slot operation command 210 received from the software 122.

The SHPC 128 in the illustrated embodiment also includes a programmable timing parameter register 204. The programmable timing parameter register 204 receives one or more timing parameter values 212 from the software 122 (or other software driver). Although depicted as a single register, the programmable timing parameter register 204 may include one or more registers that store a timing parameter value 212 received from the software 122.

Figure 3:
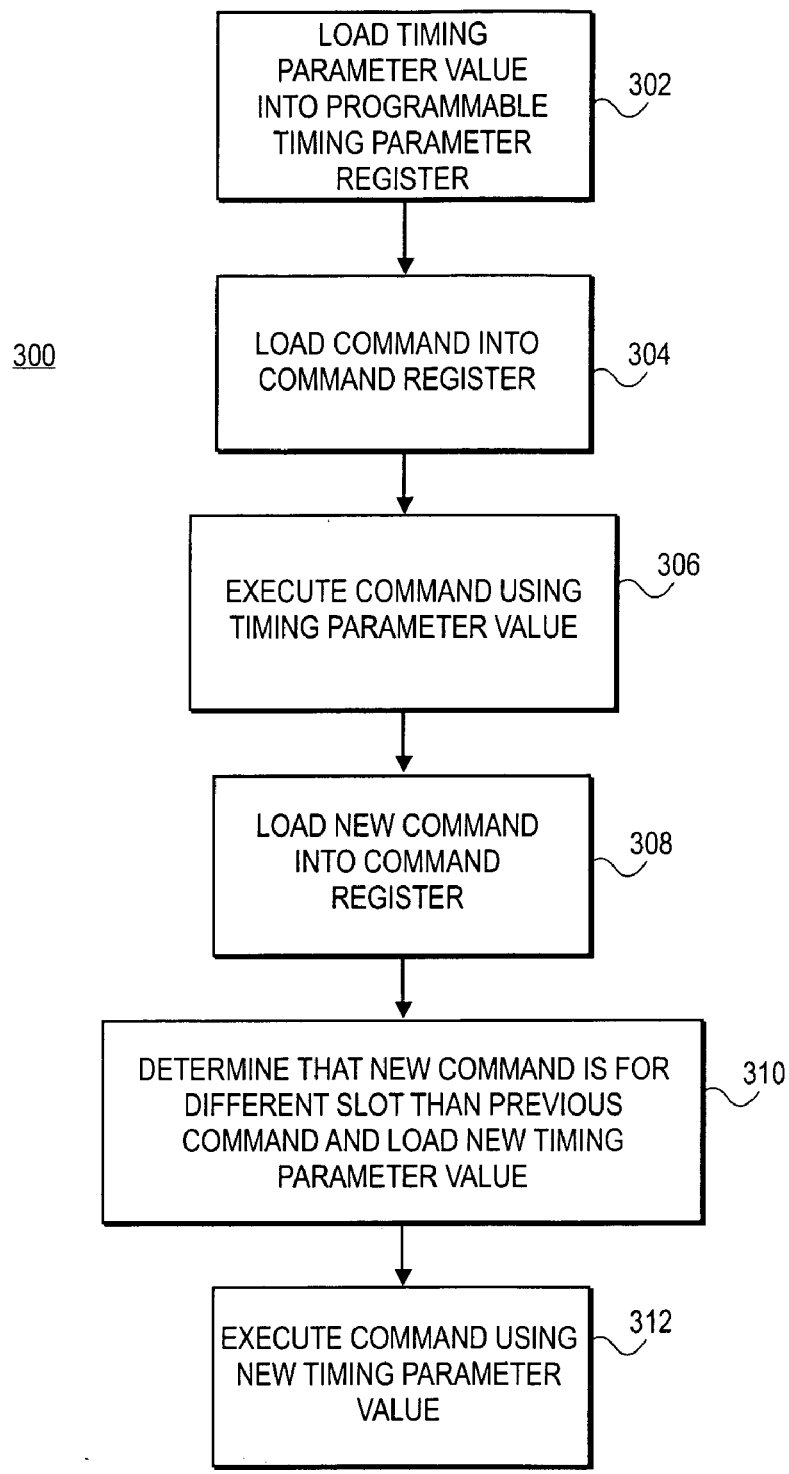
FIG. 3 is a flowchart illustrating a process for operating the standard hot-plug controller depicted in FIG. 1 according to an embodiment of the present invention.

FIG. 3 is a flowchart illustrating a process 300 for operating the SHPC 128 according to an embodiment of the present invention, wherein a different value is programmed for a timing parameter depending on the particular PCI slot being targeted. The operations of the process 300 are described as multiple discrete blocks performed in turn in a manner that is most helpful in understanding embodiments of the invention. However, the order in which they are described should not be construed to imply that these operations are necessarily order dependent or that the operations be performed in the order in which the blocks are presented.

Of course, the process 300 is only an example process and other processes may be used to implement embodiments of the present invention. A machine-accessible medium with machine-readable instructions thereon may be used to cause a machine (e.g., a processor) to perform the process 300.

In a block 302, a timing parameter value 212 is loaded into the programmable timing parameter register 204. In one embodiment, the timing parameter is Tpccc and the value is 215 milliseconds.

In a block 304, a PCI slot operation command 210 is loaded into the command register 202. In one embodiment, the SHPC 128 is loaded with a PWRONLY command for the PCI slot 108.

In a block 306, the SHPC 128 executes the PWRONLY command for the PCI slot 108 using 215 milliseconds as the value for Tpccc.

In a block 308, a new PCI slot operation command 210 is loaded into the command register 202. In one embodiment, the SHPC 128 is loaded with a PWRONLY command for the PCI slot 110.

In a block 310, the process 300 determines that the PWRONLY command is for a different slot and a new timing parameter value 212 for Tpccc is loaded into the programmable timing parameter register 204. In one embodiment, the timing parameter is Tpccc and the new value is 220.

In a block 312, the SHPC 128 executes the PWRONLY command for the PCI slot 110 using 220 milliseconds as the value for Tpccc.

Figure 4A:
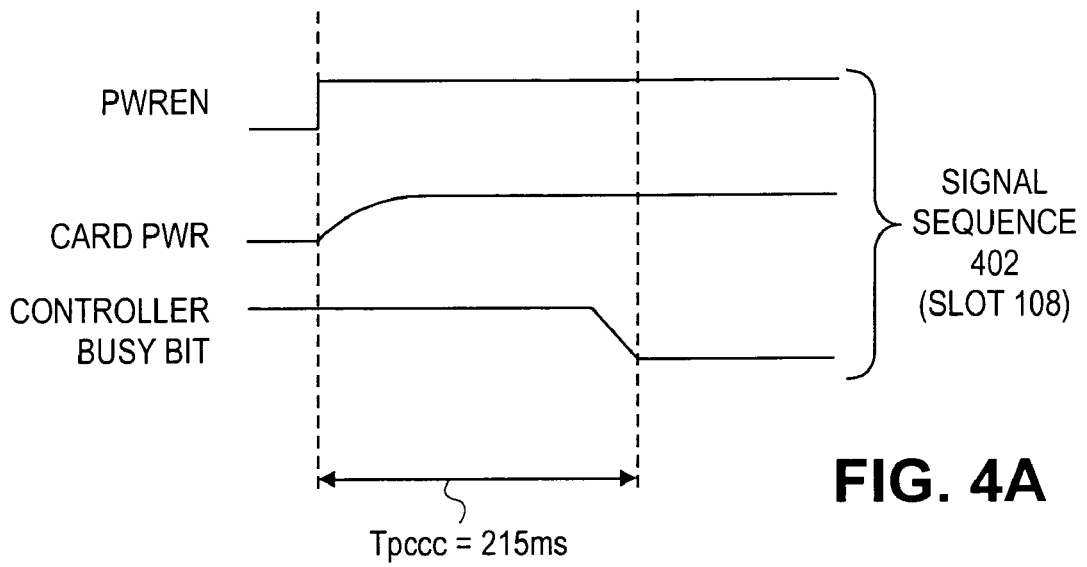
FIGS. 4a and 4b are timing diagrams illustrating signal sequences for executing a PCI slot operation command according to an embodiment of the present invention.
Figure 4B:
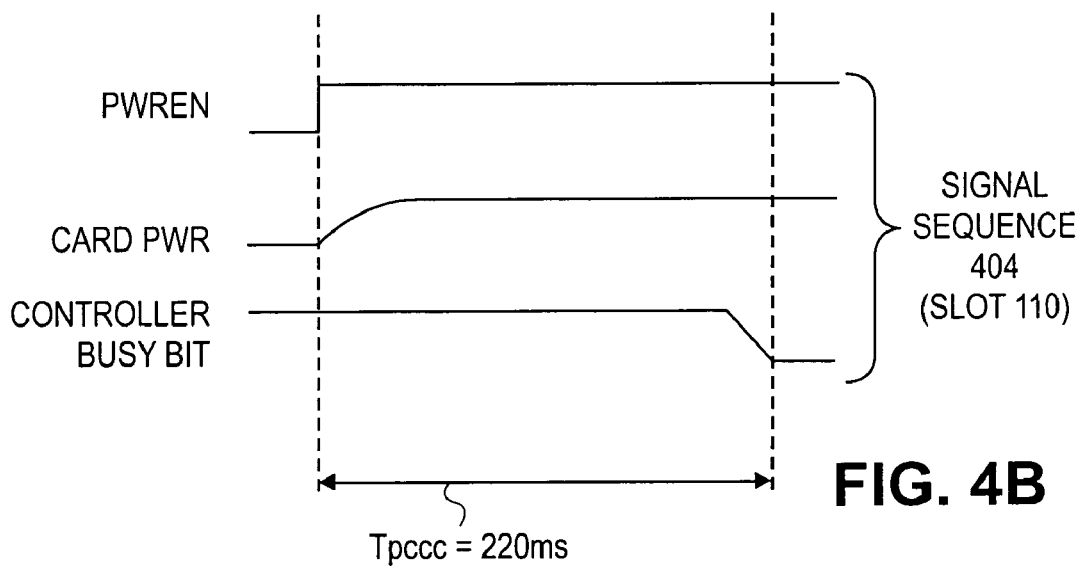

FIGS. 4a and 4b are timing diagrams illustrating a signal sequence 402 and a signal sequence 404, respectively, for executing the PWRONLY command for the different target PCI slots 108 and 110, respectively, according to an embodiment of the present invention. The signal sequences 402 and 404 include the timing parameter Tpccc, the PWREN signal, the CARD PWR signal, and the CONTROLLER BUSY BIT signal.

The timing diagrams illustrate an advantage of being able to customize the SHPC with programmable timing parameters. That is, executing the PWRONLY command using the signal sequence 402 allows the PCI slot 108 to power up more quickly than the PCI slot 110, which uses the signal sequence 404.

Although some of the signals are shown as being active high and others are shown as being active low, a person of ordinary skill in the relevant art will readily recognize how to implement embodiments of the present invention using their complements. Also, it is to be understood that timing parameters may include values for arbitration latency times.

Figure 5:
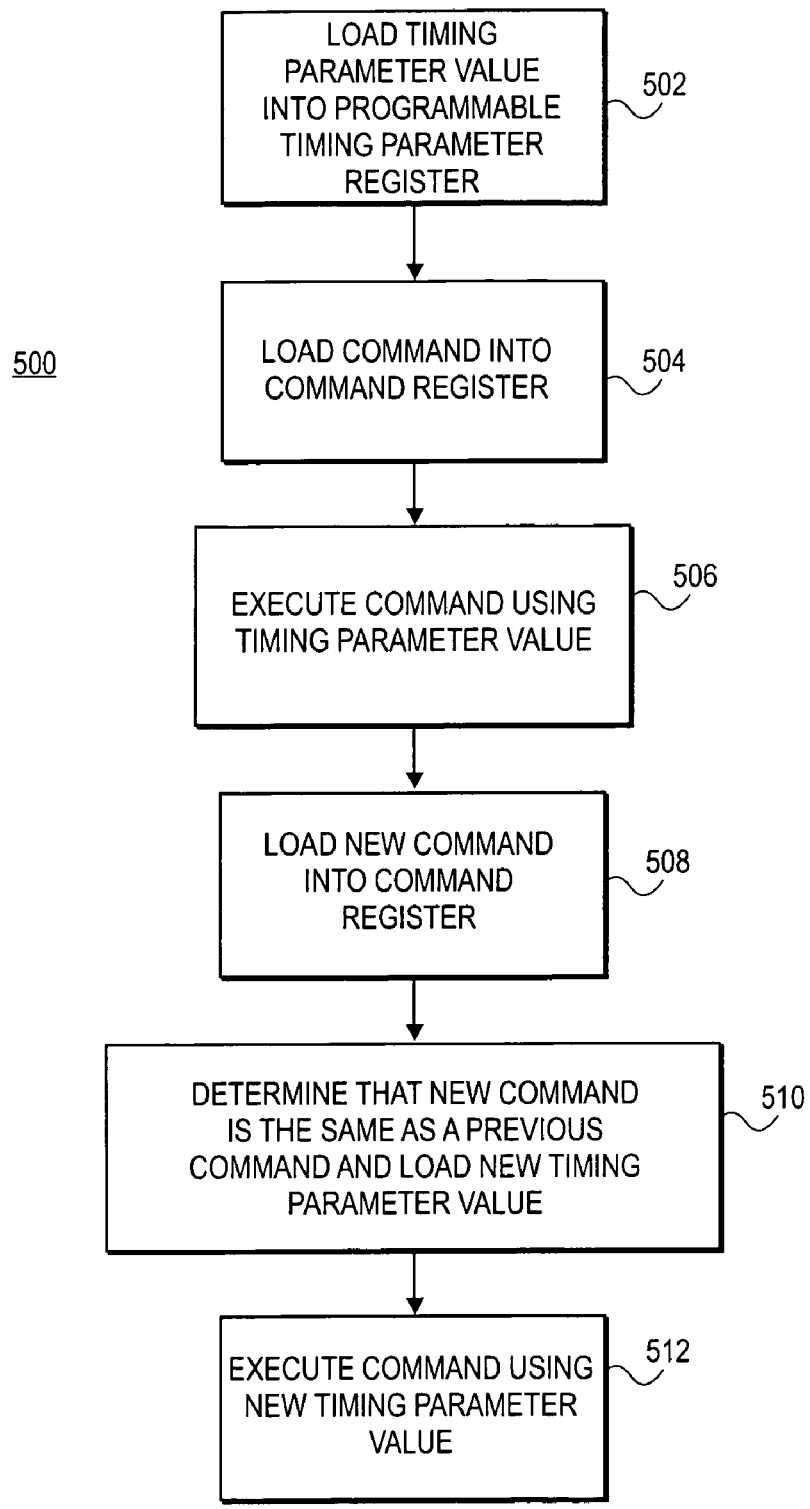
FIG. 5 is a flowchart illustrating a process for operating the standard hot-plug controller depicted in FIG. 1 according to an alternative embodiment of the present invention.

FIG. 5 is a flowchart illustrating a process 500 for operating the SHPC 128 according to an embodiment of the present invention, wherein a different value is programmed for a timing parameter depending on the number of times the PCI slot operation command is loaded into the command register 202, either consecutively or non-consecutively. The operations of the process 500 are described as multiple discrete blocks performed in turn in a manner that is most helpful in understanding embodiments of the invention. However, the order in which they are described should not be construed to imply that these operations are necessarily order dependent or that the operations be performed in the order in which the blocks are presented.

Of course, the process 500 is only an example process and other processes may be used to implement embodiments of the present invention. A machine-accessible medium with machine-readable instructions thereon may be used to cause a machine (e.g., a processor) to perform the process 500.

In a block 502, a timing parameter value 212 is loaded into the programmable timing parameter register 204. In one embodiment, the timing parameter 212 is Tpece and the value is 211 milliseconds. In an alternative embodiment, the timing parameter 212 is Tcebe and the value is 205 milliseconds.

In a block 504, a PCI slot operation command is loaded into the command register 202. In one embodiment, the SHPC 128 is loaded with an ENABLE command for the PCI slot 108.

In a block 506, the SHPC 128 executes the ENABLE command for the PCI slot 108 using 211 milliseconds as the value for Tpece and/or 205 milliseconds as the value for Tcebe.

In a block 508, a second PCI slot operation command 210 is loaded into the command register 202. In one embodiment, the SHPC 128 is loaded with a second ENABLE command for the PCI slot 108.

In a block 510, the process 500 determines that the second PCI slot operation command 210 is the same as a previous PCI slot operation command 210 (consecutive or non-consecutive) and a new timing parameter value 212 is loaded into the programmable timing parameter register 204. In one embodiment, the timing parameter value 212 is 205 milliseconds for Tpece. In an alternative embodiment, the timing parameter 212 is Tcebe and the value is 211 milliseconds.

In a block 512, the SHPC 128 executes the second ENABLE command for the PCI slot 108 using 205 milliseconds as the value for Tpece and/or 211 milliseconds for as the value for Tcebe.

Figure 6A:
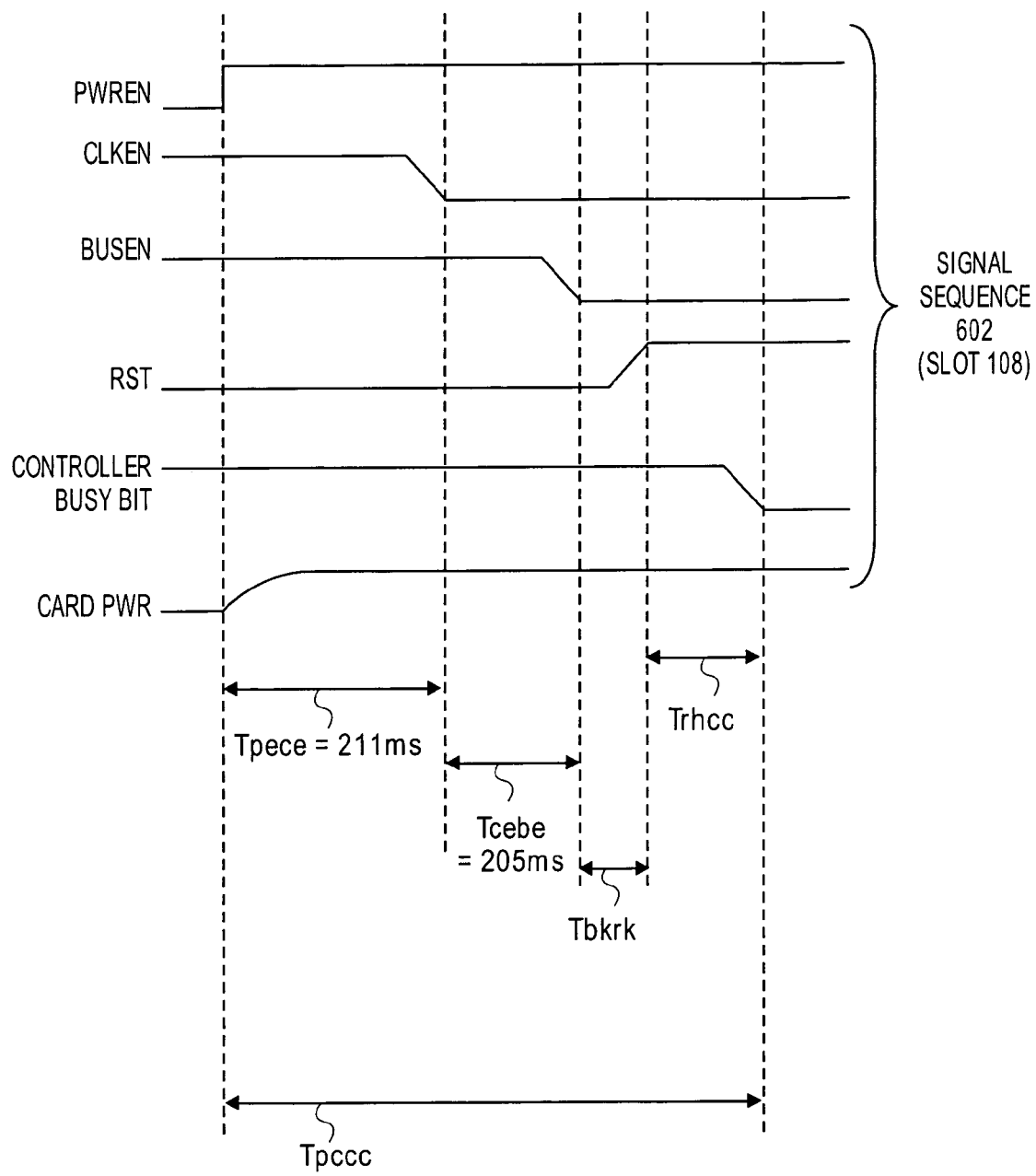
FIGS. 6a and 6b are timing diagrams illustrating signal sequences for executing a PCI slot operation command according to an alternative embodiment of the present invention.
Figure 6B:
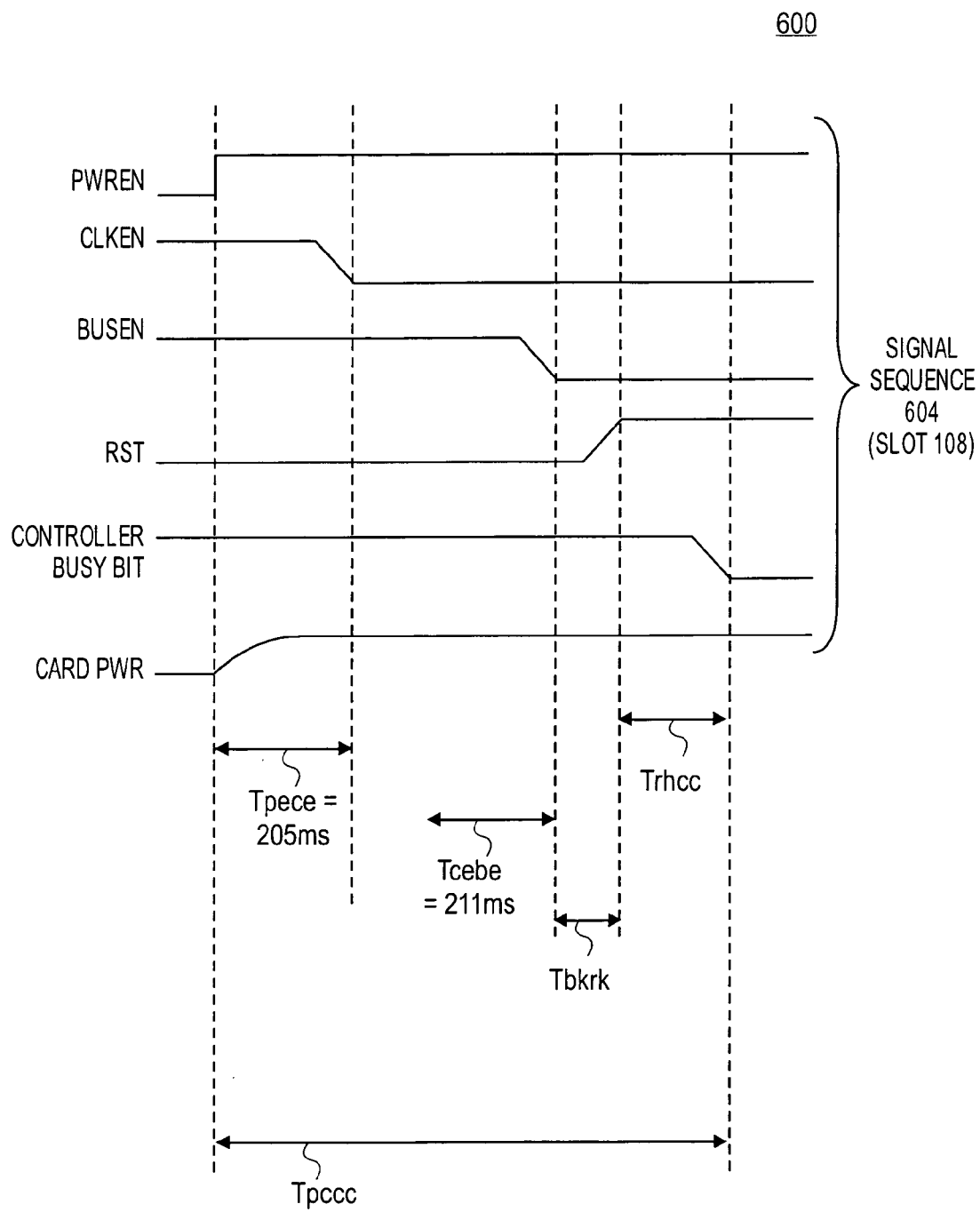

FIGS. 6a and 6b are timing diagrams illustrating a signal sequence 602 and a signal sequence 604, respectively, for executing the ENABLE command the first time and the second time, respectively, for the target PCI slot 108 according to an embodiment of the present invention. The signal sequences 602 and 604 include the timing parameters Tpece, Tbkrk, Trhcc, Tpccc, and Tcebe, the PWREN signal, the CLKEN signal, the BUSEN signal, the RST signal, the CONTROLLER BUSY BIT signal, and the CARD PWR signal. FIGS. 6a and 6b illustrate that the value for Tpece can be programmed to change on-the-fly.

The above description of illustrated embodiments is not intended to be exhaustive or to limit embodiments of the present invention to the precise forms disclosed. In embodiments of the present invention, a user may program a different value may for a timing parameter depending on the particular PCI slot operation command loaded.

For example, note that the programmable timing parameter register 204 may be programmed with one timing parameter value for Tpccc for executing the PWRONLY command for a target PCI slot (see FIGS. 3 and 4a) and another timing parameter value for Tpccc for executing the ENABLE command for the target PCI slot (see FIGS. 5, 6a, and 6b). This feature is useful for platforms and products that work best when power is stabilized before connecting clock and/or bus signals.

In embodiments of the present invention, a user may program a different value may for a timing parameter based on other suitable criteria. After reading the description herein, a person having ordinary skill in the relevant art will readily recognize how to implement embodiments of the present invention using other criteria.

Embodiments of the present invention may be implemented using hardware, software, or a combination thereof. In implementations using software, the software may be stored on a machine-accessible medium.

A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable and non-recordable media (e.g., read only memory (ROM), random access memory (RAM), magnetic disk storage media, optical storage media, flash memory devices, etc.), as well as electrical, optical, acoustic, or other form of propagated signals (e.g., carrier waves, infrared signals, digital signals, etc.).

In the above description, numerous specific details, such as particular processes, materials, devices, and so forth, are presented to provide a thorough understanding of embodiments of the invention. One skilled in the relevant art will recognize, however, that the embodiments of the present invention can be practiced without one or more of the specific details, or with other methods, components, etc. In other instances, well-known structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments.

The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

What is claimed is:

1. An apparatus, comprising:
a peripheral component interconnect (PCI) standard hot-plug controller (SHPC) having:
a first register coupled to store a first and a second PCI slot operation command, the second PCI slot operation command being different from the first PCI slot operation command; and
a second register coupled to the first register, the second register to store a first value and a second value for a timing parameter in a signal sequence for execution of the first and second PCI slot operation commands, the second value being different from the first value.

2. The apparatus of claim 1, wherein the timing parameter is a time delay between assertion of a signal to control a power state of a target PCI slot and assertion of a signal to control connection of a PCI clock to the target PCI slot.

3. The apparatus of claim 1, wherein the timing parameter is a time delay between assertion of a signal to control connection of a PCI clock to a target PCI slot and assertion of a signal to control connection of at least one bus signal to the target PCI slot.

4. The apparatus of claim 1, wherein the timing parameter is a time delay between assertion or de-assertion of a signal to control a power state of a target PCI slot and assertion of a signal indicating completion of the first or second PCI slot operation command.

5. The apparatus of claim 1, wherein the first and second first and a second PCI slot operation commands are a command to apply power to the target PCI slot, to enable the target PCI slot, to disable the target peripheral card interconnect slot, or to change the speed of the PCI bus.

6. An apparatus, comprising:
a peripheral component interconnect (PCI) standard hot-plug controller (SHPC) having:
a first register coupled to store a first and a second PCI slot operation command associated with a first and a second target PCI slot, the second target PCI slot being different from the first target PCI slot; and
a second register coupled to the first register, the second register to store a first value and a second value for a timing parameter in a signal sequence for execution of the first and the second PCI slot operation commands, the second value being different from the first value.

7. The apparatus of claim 5, wherein the timing parameter is a time delay between assertion of a signal to control a power state of a target PCI slot and assertion of a signal to control connection of a PCI clock to the target PCI slot.

8. The apparatus of claim 6, wherein the timing parameter is a time delay between assertion of a signal to control connection of a PCI clock to a target PCI slot and assertion of a signal to control connection of at least one bus signal to the target PCI slot.

9. The apparatus of claim 7, wherein the timing parameter is a time delay between de-assertion of a signal to control a power state of a target PCI slot and assertion of a signal indicating completion of the first or second PCI slot operation command.

10. An apparatus, comprising:
a peripheral component interconnect (PCI) standard hot-plug controller (SHPC) having:
a first register coupled to store a first and a second PCI slot operation command, the second PCI slot operation command being the same as the first PCI slot operation command; and a second register coupled to the first register, the second register to store a first value and a second value for a timing parameter in a signal sequence for execution of the first and the second PCI slot operation commands, the second value being different from the first value.

11. The apparatus of claim 9, wherein the timing parameter is a time delay between assertion of a signal to control a power state of a target PCI slot and assertion of a signal to control connection of a PCI clock to the target PCI slot.

12. The apparatus of claim 9, wherein the timing parameter is a time delay between assertion of a signal to control connection of a PCI clock to a target PCI slot and assertion of a signal to control connection of at least one bus signal to the target PCI slot.

13. The apparatus of claim 9, wherein the timing parameter is a time delay between de-assertion of a signal to control a power state of a target PCI slot and assertion of a signal indicating completion of the first or second PCI slot operation command.

14. An article of manufacture including a machine-accessible medium having data that, when accessed by a machine, cause the machine to perform the operations comprising:
receiving at a first register in a standard hot-plug controller (SHPC) a first value for a timing parameter in a signal sequence for execution of a first peripheral component interconnect (PCI) slot operation command;
receiving at a second register in the (SHPC) a second PCI slot operation command;
executing the first PCI slot operation command using the signal sequence and the first value for the timing parameter;
receiving at the second register a second PCI slot operation command different from the first PCI slot operation command; and
receiving at the first register a second value different from the first value for the timing parameter in the signal sequence for execution of the second PCI slot operation command.

15. The article of manufacture of claim 13, wherein the timing parameter is a time delay between assertion of a signal to control a power state of at least one PCI slot and assertion of a signal to control connection of a PCI clock to the at least one target PCI slot using the first and second values.

16. The article of manufacture of claim 13, wherein the timing parameter is a time delay between assertion of a signal to control connection of a PCI clock to at least one target PCI slot and assertion of a signal to control connection of at least one bus signal to the at least one target PCI slot using the first and second values.

17. The article of manufacture of claim 13, wherein the timing parameter is a time delay between de-assertion of a signal to control a power state of at least one target PCI slot and assertion of a signal indicating completion of the first or second PCI slot operation command.

18. The article of manufacture of claim 13, further comprising executing the second PCI slot operation command using the signal sequence and the second value for the timing parameter.

19. An article of manufacture including a machine-accessible medium having data that, when accessed by a machine, cause the machine to perform the operations comprising:
receiving at a first register in a standard hot-plug controller (SHPC) a first peripheral component interconnect (PCI) slot operation command associated with a first target PCI slot and receiving at a second register in the SHPC a first value for a timing parameter in a signal sequence for execution of the first PCI slot operation command;
executing the first PCI slot operation command for the first target PCI slot using the signal sequence and the first value for the timing parameter; and
receiving at the first register a second PCI slot operation command associated with a second target PCI slot and receiving at the second register a second value different from the first value for the timing parameter in the signal sequence for execution of the second PCI slot operation command.

20. The article of manufacture of claim 18, wherein the timing parameter is a time delay between assertion of a signal to control a power state of at least one PCI slot and assertion of a signal to control connection of a PCI clock to the at least one target PCI slot using the first and second values.

21. The article of manufacture of claim 18, wherein the timing parameter is a time delay between assertion of a signal to control connection of a PCI clock to at least one target PCI slot and assertion of a signal to control connection of at least one bus signal to the at least one target PCI slot using the first and second values.

22. The article of manufacture of claim 18, wherein the timing parameter is a time delay between de-assertion of a signal to control a power state of at least one target PCI slot and assertion of a signal indicating completion of the first or second PCI slot operation command.

23. The article of manufacture of claim 18, further comprising executing the second PCI slot operation command using the signal sequence and the second value for the timing parameter.

24. An article of manufacture including a machine-accessible medium having data that, when accessed by a machine, cause the machine to perform the operations comprising,
receiving at a first register in a standard hot-plug controller (SHPC) a first value for a timing parameter in a signal sequence for execution of a first peripheral component interconnect (PCI) slot operation command;
receiving at a second register in the (SHPC) a second PCI slot operation command;
executing the first PCI slot operation command using the signal sequence and the first value for the timing parameter;
receiving at the second register a second PCI slot operation command the same as the first PCI slot operation command; and
receiving at the first register a second value different from the first value for the timing parameter in the signal sequence for execution of the second PCI slot operation command.

25. The article of manufacture of claim 23, wherein the timing parameter is a time delay between assertion of a signal to control a power state of at least one PCI slot and assertion of a signal to control connection of a PCI clock to the at least one target PCI slot using the first and second values.

26. The article of manufacture of claim 23, wherein the timing parameter is a time delay between assertion of a signal to control connection of a PCI clock to at least one target PCI slot and assertion of a signal to control connection of at least one bus signal to the at least one target PCI slot using the first and second values.

27. The article of manufacture of claim 23, wherein the timing parameter is a time delay between de-assertion of a signal to control a power state of at least one target PCI slot and assertion of a signal indicating completion of the first or second PCI slot operation command.

28. The article of manufacture of claim 23, further comprising executing the second PCI slot operation command using the signal sequence and the second value for the timing parameter.

29. A system, comprising:
a peripheral component interconnect (PCI) standard hot-plug controller (SHPC) having a first register coupled to store a first and a second PCI slot operation command associated with a first and a second target PCI slot, the second target PCI slot being different from the first target PCI slot, and a second register coupled to the first register, the second register to store a first value and a second value for a timing parameter in a signal sequence for execution of the first and the second PCI slot operation commands, the second value being different from the first value; and
a static random access memory (SRAM) coupled to the microprocessor.

30. The system of claim 28, further comprising a memory controller coupled to the memory.

31. The system of claim 29, further comprising a software driver coupled to provide the first and the second PCI slot operation commands.

* * * * *